No. 716,495. Patented Dec. 23, 1902.
H. M. TAYLOR.
ANIMAL POKE.
(Application filed Oct. 13, 1901.)
(No Model.)
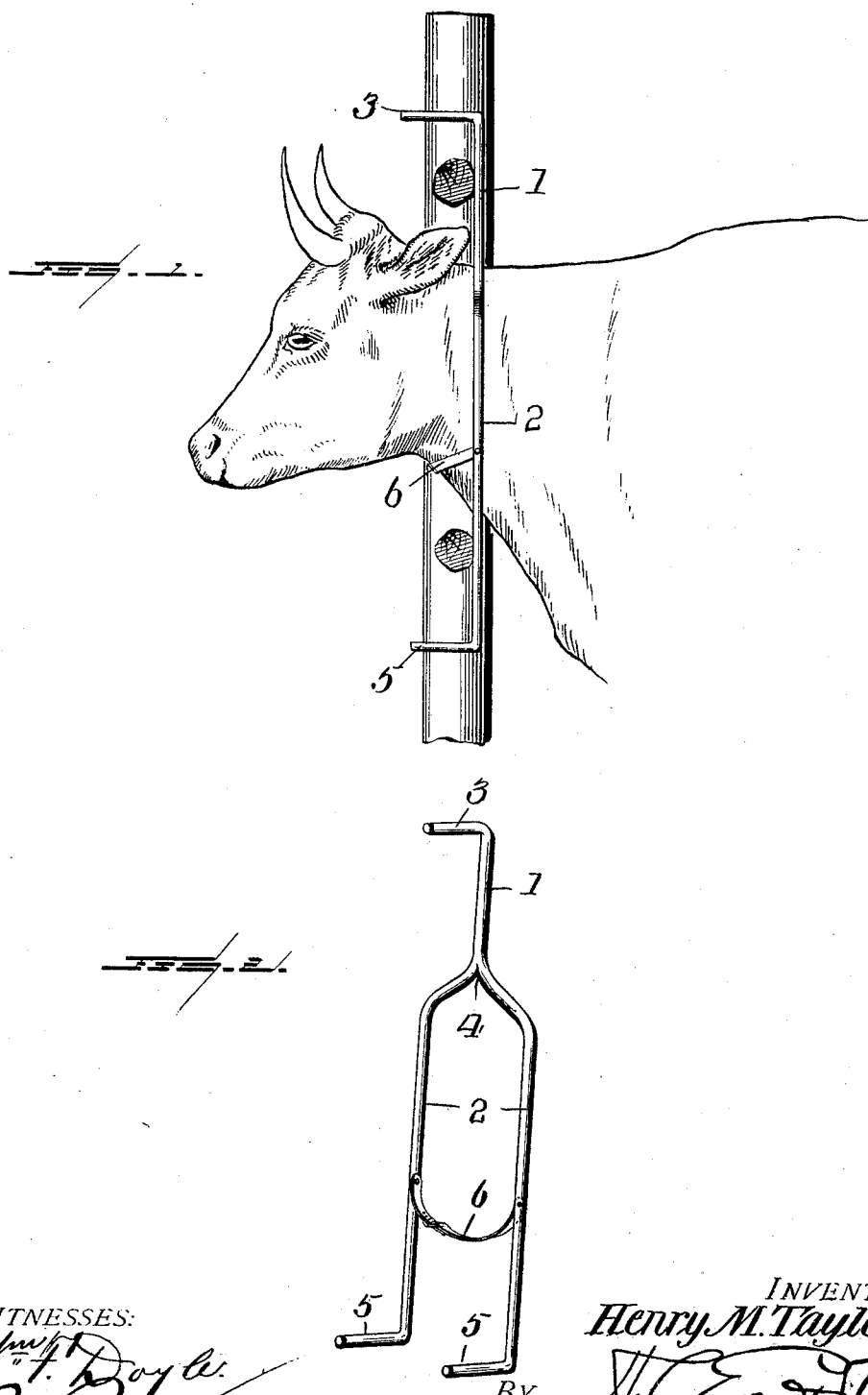
WITNESSES:
INVENTOR
Henry M. Taylor.
BY
Attorneys.

UNITED STATES PATENT OFFICE.

HENRY M. TAYLOR, OF ALBIA, IOWA.

ANIMAL-POKE.

SPECIFICATION forming part of Letters Patent No. 716,495, dated December 23, 1902.

Application filed October 18, 1901. Serial No. 79,114. (No model.)

*To all whom it may concern:*

Be it known that I, HENRY M. TAYLOR, a citizen of the United States of America, residing at Albia, in the county of Monroe and State of Iowa, have invented certain new and useful Improvements in Animal-Pokes, of which the following is a specification, reference being had therein to the accompanying drawings.

My invention relates to certain new and useful improvements in animal-pokes, and relates more particularly to that class wherein spurs or other pricking instruments are entirely dispensed with, the means employed being such as will produce a choking sensation upon the throat of the animal without the attendance of any danger resulting from the use of such spurs.

A further object of my invention is to produce a device wherein the poke may be placed in position without slipping the same over the animal's head.

A further object of my invention is to produce an integral device which comprises few parts, can be cheaply manufactured, and at the same time provide a substantial and rigid poke.

With these and other objects in view my invention further consists in the novel details of construction and combination of parts to be clearly described in the following specification and fully set forth in the claim.

Referring to the accompanying drawings, in which like characters indicate similar parts throughout the several views, Figure 1 is a side elevation showing my improved poke in position on an animal, the poke being shown in engagement with a fence. Fig. 2 is a perspective view of the poke.

In the practical embodiment of my invention I have found that the best results are obtained, in order to provide a rigid and substantial poke, by two methods to be here described.

One manner of forming the yoke member integral with the bar or rod 1 consists in welding these yoke members to the lower end of bar 1, thus making an integral poke, the poke itself being hammered into the desired shape by placing the same on the horn of the anvil. Another method consists in splitting a bar of iron or steel from the highest point of the yoke and spreading the yoke members and forming the same in the desired shape. When this latter method is used, the bar or rod 1 is then drawn out to a size and shape symmetrical to the yoke members or bars 2.

The upper extremity of bar 1 is provided with an outwardly-extending arm or lug 3. The yoke 4 is of a size and shape adapted to conveniently conform to the shape of the animal's neck. The members 2 extend downwardly parallel with one another and have a space between themselves throughout their entire length. Thus the necessity of slipping the yoke over the animal's head is entirely dispensed with, as it simply requires a slight vertical movement to remove the same. The lower extremities of these members 2 are each provided with outwardly-extending arms or lugs 5 5, being approximately parallel with arm 3, the purpose of these arms being, as is well known in the art, to engage the longitudinal strands or bars of the fence or barrier. In my invention should the arms engage the fence bars or strands and the animal persist in exerting pressure thereon a choking sensation will be effected upon the animal's throat by means of a strap 6, formed in two parts, one of which is secured to each member 2 by means of rivets or other suitable means. This strap also serves as a means for holding the device upon the animal, and it is obvious that by unloosing of the same ready removal of the poke may be had.

I desire to call particular attention to the total absence in my invention of any spurs or other pricking instruments. The sole means employed for causing the animal to desist in his movements is the strap, which by reason of engagement with the under side of the animal's throat (the throat being most tender on that side) produces this choking sensation without the attendance of any bodily injury common to the use of spurs, which often cause the flow of blood and result in blood-poison.

It will be noted that various changes may be made in details of construction and combination of parts without departing from the general spirit of my invention.

Having thus fully described my invention, what I claim to be new and useful, and desire to secure by Letters Patent, is—

An animal-poke comprising an upper bar provided at its upper end with a forwardly-projecting integral arm, a pair of parallel lower bars, said lower bars having their upper ends bent inwardly and formed integral with the lower end of the said upper bar, forwardly-extending arms formed integral with the lower ends of the last-named bars, and a strap formed in two sections, said strap-sections being secured one to each of the said lower bars at points adjacent the lower ends thereof, and means for securing the free ends of the said straps together, substantially as described.

In testimony whereof I affix my signature in the presence of two witnesses.

HENRY M. TAYLOR.

Witnesses:
E. MART NOBLE,
W. C. RAMSAY.